(No Model.)
E. T. REICHERT.
SECONDARY BATTERY.
No. 315,339. Patented Apr. 7, 1885.
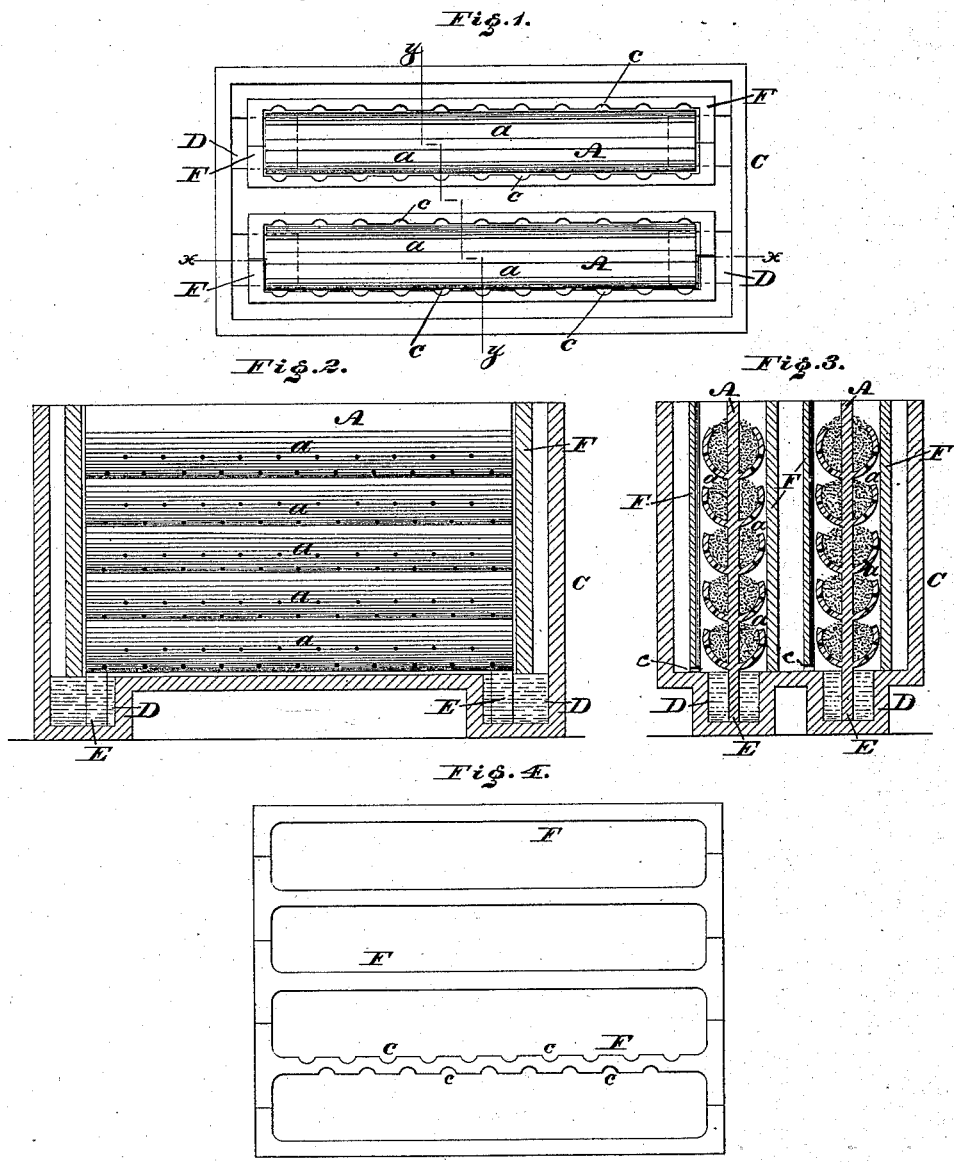
WITNESSES:
A. P. Grant
W. F. Kircher
INVENTOR:
Edward T. Reichert
BY John A. Diedersheim
ATTORNEY.

UNITED STATES PATENT OFFICE.

EDWARD T. REICHERT, OF PHILADELPHIA, PENNSYLVANIA, ASSIGNOR OF ONE-HALF TO HENRY D. WELSH, OF SAME PLACE.

SECONDARY BATTERY.

SPECIFICATION forming part of Letters Patent No. 315,339, dated April 7, 1885.

Application filed December 15, 1882. (No model.)

*To all whom it may concern:*

Be it known that I, EDWARD T. REICHERT, a citizen of the United States, residing in the city and county of Philadelphia, State of Pennsylvania, have invented a new and useful Improvement in Secondary Batteries, which improvement is fully set forth in the following specification and accompanying drawings, in which—

Figure 1 is a top or plan view of a form of a battery embodying my invention. Fig. 2 is a vertical section thereof in line $x\ x$, Fig. 1. Fig. 3 is a transverse section in line $y\ y$, Fig. 1. Fig. 4 is a top view of a modification.

Similar letters of reference indicate corresponding parts in the several figures.

My invention has for its object the construction and preparation of the electrodes or elements, the porous plates or partitions, and the outer or containing jar or vessel of a secondary battery, whereby the electro-chemical effects and general utility of the battery may be materially increased.

My invention consists, first, in the construction of electrodes or elements of metal, alloy, or other suitable material, having for its aim the production of the greatest amount of surface for the least weight of metal, &c., and by so arranging the parts of the electrode or element that a large amount of oxidizable or polarizable material can be supported and maintained in position without the necessary aid or use of any other support.

It further consists of an electrode consisting of a plate having attached to its sides a series of concave troughs which are open on top and filled with active material.

It further consists of a porous plate or partition having grooves in its side or sides and across its lower edge to facilitate the circulation of the electrolytic fluid.

It further consists in a double cell formed of three detachable plates or partitions which have lateral projections at their ends, said projections fitting together and closing the ends of the cell.

It further consists in a series of separable porous plates, which form the walls of a cell open at the top, in combination with an electrode inclosed therein, said plates fitting closely to the sides and ends of said electrodes.

It further consists in a series of separable porous plates or partitions provided with wedges or cords for holding them in place, in combination with an electrode or electrodes inclosed within the cell formed by said plates, the latter fitting the sides and ends of said electrodes.

It further consists in an electrode consisting of a solid wall having troughs attached thereto along their middle line and open on top, said troughs curving upward on each side of said wall.

It further consists of an electrode provided with troughs on each side of the central wall thereof, in combination with plates arranged in proximity to said walls to prevent bulging, all substantially as hereinafter set forth and claimed.

Referring to the drawings, A represents an electrode or element constructed of a series of superimposed troughs, or almost completely closed tubes or canals, $a$, which are supported by a suitable frame, and contain or are coated with a cement or coating of oxidizable or polarizable material. It will be seen that not only is there a very large surface of the metal, alloy, &c., composing the body of the electrode or element for a minimum weight of metal, and also an extraordinarily-well-adapted mechanism attained for the support and maintenance of the oxidizable, &c., material in position; but there is effectually overcome the liability of the coating to fall from the electrode or element on account of jarring, the expansion and contraction of the coating or supporting metal, the action of gases given off by the electrodes or elements, or the action due to agitation of the water, &c., all of which causes tend to separate the coating from the electrodes or elements, causing a precipitation or falling, and thus in time greatly impairing the utility of the battery. The aforesaid electrode or element may be made of lead, copper, tin, alloys, or any other suitable material, in, on, or against which may be placed or deposited, electro-chemically or by other suitable means, the oxides of those metals or other salts or suitable substances. The troughs may be made of a V shape, square, half-round, or of any suitable design. The troughs, frame-work, &c., are perforated with small openings, whereby the weight of the electrode or element is diminished.

C represents the containing jar or vessel, in the bottom of which are receptacles D for mercury, into which dip prolongations E of the electrode or element, whereby the latter are kept constantly amalgamated, thus preventing local action occurring on the surface of the electrode or element, due to impurities in the metal or material of which it is constructed, and as a consequence increasing the electro-chemical effects of the battery; and, moreover, by having said prolongations dip into the mercury the electrode or element is kept continually amalgamated without the necessity of removing it from the battery and disturbing the coating or deposit thereon.

In the preliminary preparation of the electrode or element of a secondary battery I immerse it in a strong alkaline solution of caustic potash, caustic soda, or other suitable substance, whereby grease and other foreign matter are removed, and after washing it then immerse it in dilute nitric acid or other suitable oxidizing agent, whereby the electrode or element is rendered porous and more susceptible to electro-chemical influences, thereby diminishing the amount of work necessary in "forming" the electrode or element. The electrodes or elements are then placed in the electrolyte, and are then subjected to the influences of an electric current, the battery being charged and discharged, as in the formation of the Planté cell, until there is a well crystallized surface formed. The electrodes or elements are then taken from the electrolyte, and are coated or filled with a deposit of suitable polarizable substance. The object in forming the aforesaid crystallized surface previous to mechanically coating or filling with polarizable material being that the formation of a non-conducting oxide between the surface of the electrode and mechanical coating is in part, at least, prevented. I further prefer in adding the mechanical coating or filling to add but a portion or a layer at a time, charging and discharging the battery several times in opposite directions before a second layer is applied, thus making the coating a more integral part of the electrode.

F represents porous plates or partitions, made of earthenware or other suitable non-conducting material, on the side or sides and bottom edges of which are vertical, oblique, or horizontal grooves c, said plates forming a casing and closely embracing the electrode or element, while the grooves permit a free circulation of the electrolytic fluid. These plates are separable from one another, but easily put together to form a cell for the electrode and oxidizable material.

Referring to Fig. 3, it will be seen that the troughs embraced by the porous plate are converted into a system of closed tubes, said troughs being filled with coating or cement, hereinbefore referred to.

Referring to Fig. 4, it will be observed that when two of the double-T or double-L shape plates, partitions, &c., are brought together, a bottomless cell or casing is formed, in which the electrode or element is placed and is closely embraced. When three of these plates or partitions are brought together, a double cell or casing is formed having a common partition to both. These porous plates or partitions may be bound together with wire, cord, or clamp, or other suitable method, or may be wedged in between the sides of the containing-jar, on the sides of which may be suitable projections.

The principal objects attained by the use and peculiar construction of the above-specified porous plates, partitions, or casings are as follows: The prevention of the formation of "lead trees" or other deleterious formations between the electrodes or elements, by being placed in direct contact with the sides and ends of the aforesaid troughs, tubes, or canals. The sides of said troughs, tubes, or canals may be bent outward, thus forming larger cavities or receptacles for the deposition of coating, cement, &c. By being placed in direct contact with the edges and ends of said troughs, &c., the said troughs, &c., are virtually converted into a system of closed tubes, whereby the action of mechanical causes, as hereinbefore specified, is prevented from separating or precipitating any of the coating, cement, &c., from the electrodes or elements. By being placed in direct contact with the sides or edges and ends of said troughs, tubes, or canals, the said troughs, &c., are substantially and securely braced, thus effectually overcoming any tendency of the electrode or element to swag, bulge, or become otherwise displaced, whereby the said electrode or element can be made exceedingly light. By having vertical, oblique, or horizontal grooves on the side or sides and bottom edges, a free circulation of the electrolytic fluid is permitted when the plates, partitions, or casings are closely embracing the electrodes or elements. By having plates or partitions so constructed as to form a double cell when three are brought together, the partition between each two cells being common to both, an extra partition is obviated, whereby the weight, bulk, and expense of the battery are diminished.

I do not here broadly claim an electrode having flanges on its side, that being shown in my application No. 79,333. For the same reason I disclaim in this application a double cell consisting of an outer wall or walls and an inner wall or partition, the latter dividing into two parts the space inclosed by the former.

Having thus described my invention, what I claim as new, and desire to secure by Letters Patent, is—

1. In a secondary battery, an electrode consisting of a plate, A, having attached to its sides, and integral therewith, a series of concave troughs, a, which are open on top, as shown, and filled with active material.

2. In a secondary battery, a porous plate or partition having grooves in its side or sides and across its lower edge to facilitate the circulation of the electrolytic fluid, substantially as set forth.

3. In a secondary battery, a double cell formed of three detachable plates or partitions which have lateral projections at their ends, said projections fitting together and closing the ends of the cell, substantially as shown.

4. In a secondary battery, a series of separable porous plates, which form the walls of a cell open at the top, in combination with an electrode or electrodes inclosed therein, said plates fitting closely to the sides and ends of said electrodes, substantially as and for the purpose set forth.

5. In a secondary battery, a series of separable porous plates or partitions provided with wedges or cords for holding them in place, in combination with an electrode or electrodes inclosed within the cell formed by said plates, the latter fitting the sides and ends of said electrodes, substantially as shown.

6. An electrode consisting of a solid wall, having troughs attached thereto and integral therewith along their middle line and open on top, said troughs curving upward on each side of said wall, substantially as and for the purpose set forth.

7. An electrode provided with troughs on each side of the central wall thereof, in combination with plates arranged in proximity to said wall to prevent bulging, substantially as set forth.

EDWARD T. REICHERT.

Witnesses:
JOHN A. WIEDERSHEIM,
A. P. GRANT.